United States Patent
Okuhara

(10) Patent No.: US 8,427,659 B2
(45) Date of Patent: Apr. 23, 2013

(54) INFORMATION PROCESSING APPARATUS WHICH CAN SELECTIVELY OPERATE AS STORAGE DEVICE OR PRINTER DEVICE, METHOD OF CONTROLLING SAME, RECORDING MEDIUM AND PRINTER WHICH CAN SELECTIVELY OPERATE AS STORAGE DEVICE OR PRINTER DEVICE

(75) Inventor: Ryusuke Okuhara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 12/603,105

(22) Filed: Oct. 21, 2009

(65) Prior Publication Data

US 2010/0118326 A1    May 13, 2010

(30) Foreign Application Priority Data

Nov. 13, 2008   (JP) ................. 2008-291495

(51) Int. Cl.
*G06F 3/12*    (2006.01)
*G06K 15/00*    (2006.01)

(52) U.S. Cl.
USPC ........................................ 358/1.13; 358/1.16

(58) Field of Classification Search ........................ None
See application file for complete search history.

(56) References Cited

U.S. PATENT DOCUMENTS

| | | | |
|---|---|---|---|
| 7,502,049 B2 * | 3/2009 | Aichi et al. ................ | 348/207.2 |
| 7,936,373 B2 * | 5/2011 | Masumoto et al. ........ | 348/207.2 |
| 2007/0046972 A1 * | 3/2007 | Hirai ............................ | 358/1.13 |
| 2010/0031250 A1 * | 2/2010 | Hasegawa ................... | 717/174 |

FOREIGN PATENT DOCUMENTS

| | | |
|---|---|---|
| JP | 2003-150530 | 5/2003 |
| JP | 2008-139916 A | 6/2008 |

OTHER PUBLICATIONS

Oct. 12, 2012 Japanese Office Action, which is enclosed without English Translation, that issued in Japanese Patent Application No. 2008-291495.

* cited by examiner

*Primary Examiner* — Gabriel Garcia
(74) *Attorney, Agent, or Firm* — Cowan, Liebowitz & Latman, P.C.

(57) ABSTRACT

There is provided an information processing apparatus including: a memory storing a first descriptor indicating that the information processing apparatus operates as a storage device, a second descriptor indicating that the information processing apparatus operates as another device different from the storage device, and a driver which is used by the host apparatus in order to control the information processing apparatus as the other device in accordance with a given standard; a communication unit which, at the start of communication with the host apparatus, transmits the first descriptor to the host apparatus and communicates with the host apparatus in such a manner that the host apparatus is capable of accessing the driver; and a changing unit for changing the descriptor that the communication unit transmits to the host apparatus to the second descriptor after the driver has been accessed from the host apparatus.

11 Claims, 5 Drawing Sheets

INFORMATION PROCESSING APPARATUS WHICH CAN SELECTIVELY OPERATE AS STORAGE DEVICE OR PRINTER DEVICE, METHOD OF CONTROLLING SAME, RECORDING MEDIUM AND PRINTER WHICH CAN SELECTIVELY OPERATE AS STORAGE DEVICE OR PRINTER DEVICE

BACKGROUND OF THE INVENTION

1. Field of the Invention

The present invention relates to an information processing apparatus that operates upon being connected to a host apparatus, a method of controlling the information processing apparatus, a recording medium and a printer.

2. Description of the Related Art

In order that various peripherals (client apparatuses) (e.g., a printer or digital camera) used upon being connected to a personal computer (PC) may send and receive data to and from the personal computer, they are equipped with various communication interfaces. Among such interfaces, a USB (Universal Serial Bus) interface can be utilized inexpensively and conveniently and therefore is finding widespread use as the communication interface in various peripherals.

In order to connect a personal computer and, say, a printer using a USB interface, a device driver (printer driver) specific to this printer must be installed in the personal computer. The personal computer can acquire the printer driver by downloading the printer driver via the Internet or by reading the printer driver from an external medium such as a CD (Compact Disk).

However, all personal computers that are connected to the printer are not necessarily connected to the Internet and always carrying about an external medium along with the printer requires some effort on the part of the user.

In view of these problems, the specification of Japanese Patent Laid-Open No. 2003-150530 proposes a printer equipped with a printing device and a mass storage device storing a driver program for controlling the printing device. The printer is equipped with a USB control program that causes the host apparatus to recognize a USB interface as a USB hub. After the host apparatus is made to recognize the mass storage device, the host apparatus is made to recognize the printing device. As a result, the driver program is installed in the host apparatus and the host apparatus is capable of recognizing the printing device.

However, in accordance with the technique described in Japanese Patent Laid-Open No. 2003-150530, the printer must be equipped with a physical mechanism for functioning as a USB hub. The problem that arises is an apparatus of greater complexity and higher cost.

Further, the specification of Japanese Patent Laid-Open No. 2003-150530 also discloses a technique in which the connection of the mass storage device is disconnected if the driver program has been installed in the host apparatus. In accordance with this technique, the mass storage device is connected and disconnected whenever the printer is connected to the host apparatus. As a consequence, a load is imposed upon the host apparatus.

SUMMARY OF THE INVENTION

A feature of the present invention is to solve all of the foregoing problems or at least one of them.

According to one aspect of the present invention, there is provided an information processing apparatus comprising:

a memory that stores a first descriptor indicating that the information processing apparatus operates as a storage device, a second descriptor indicating that the information processing apparatus operates as another device different from the storage device, and a driver which, in a case where the information processing apparatus is operating as the storage device, is information accessible by a host apparatus and is used by the host apparatus in order to control the information processing apparatus as the other device in accordance with a given standard;

a communication unit which, at the start of communication with the host apparatus, transmits the first descriptor to the host apparatus and communicates with the host apparatus in such a manner that the host apparatus is capable of accessing the driver; and a changing unit that changes the descriptor that the communication unit transmits to the host apparatus to the second descriptor after the driver has been accessed from the host apparatus.

Further features of the present invention will become apparent from the following description of exemplary embodiments with reference to the attached drawings.

DESCRIPTION OF THE EMBODIMENT

An embodiment of the present invention will be described below with reference to the accompanying drawings. The embodiment described below will be useful in order to understand various concepts of the present invention, from broader to narrower concepts thereof.

The technical scope of the present invention is finalized by the scope of the claims and is not limited by the embodiment set forth below. Further, all combinations of features described in the embodiment are not necessarily essential in the present invention.

In an embodiment set forth below, a printer, which is one type of information processing apparatus, is described as a client apparatus, and a USB interface compliant with the USB standard is described as one example of a communication interface. However, this does not impose any limitation. For example, the client apparatus may be a digital still camera, a video camera or a scanner. Further, the communication interface may be an interface compliant with IEEE 1394. In this case, terminology (e.g., "mass storage class") specific to the prescribed standard is to be utilized appropriately in accordance with the standard.

Figure 1:
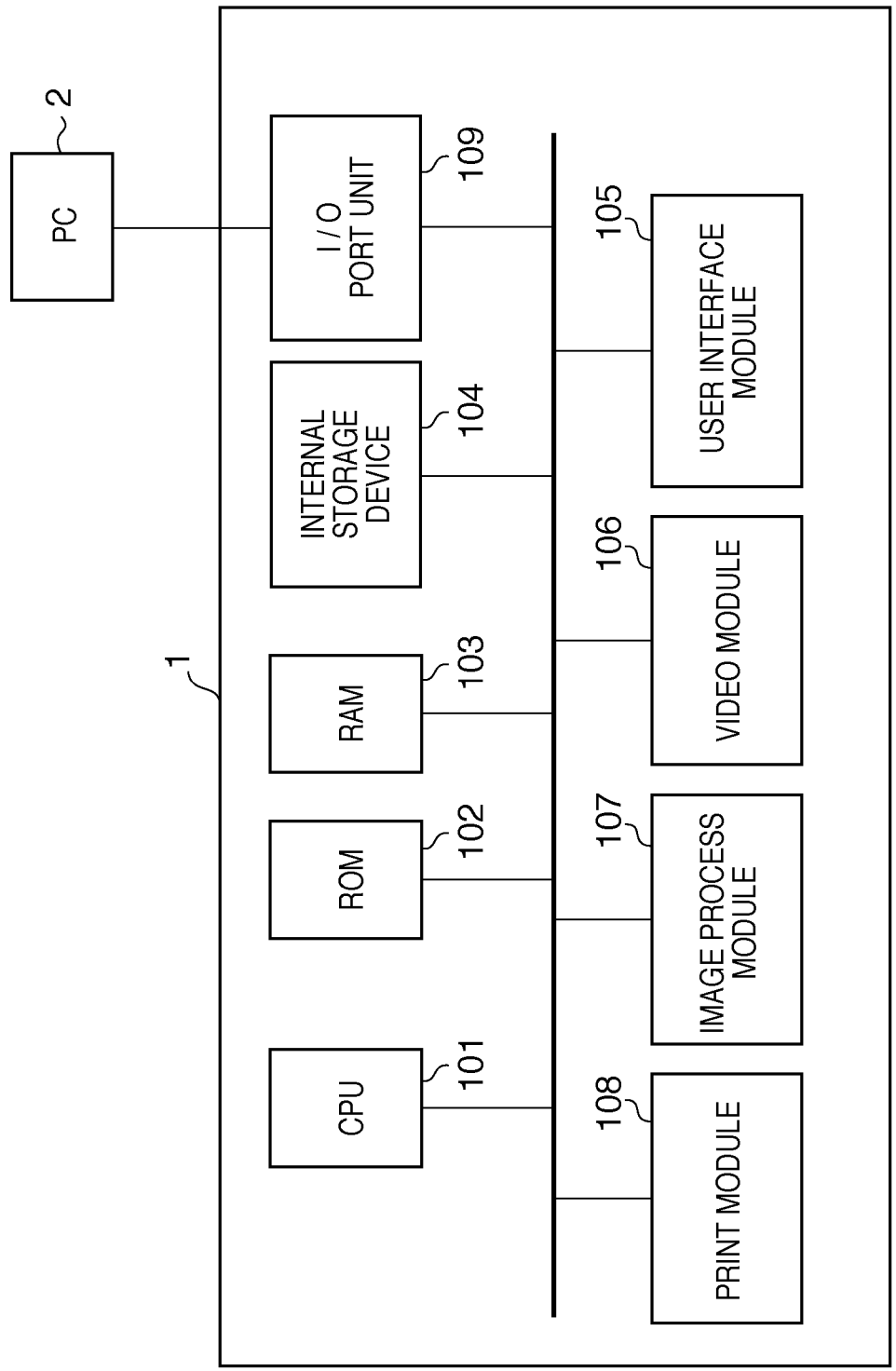
FIG. 1 is a functional block diagram illustrating the configuration of a printer according to an embodiment of the present invention.

FIG. 1 is a functional block diagram illustrating the configuration of a printer 1 according to this embodiment. The printer 1 includes a CPU 101 for executing various processing; a ROM 102 in which a program executed by the CPU 101 and various data are stored in advance; a RAM 103 for storing various data while the CPU 101 is operating; and an internal storage device 104 serving as a storage area in which a printer driver specific to the printer 1 is stored and which is capable of being referred to by a personal computer 2 connected to the printer 1 via the USB mass storage class. The printer 1 further includes a user interface module 105 which has user-operated buttons and reads the state of these buttons; a video module 106 for displaying images to be printed and settings of the printer 1; an image process module 107 for processing image data received from the personal computer 2; a print module 108 having a printhead and paper feed/discharge motors, etc., for printing print data created by the image process module 107; and input/output port unit 109 connected to the personal computer 2 for sending and receiving data via USB.

The internal storage device 104 holds descriptor data for causing the personal computer 2 to recognize the printer 1 as a mass storage class device (storage device), and descriptor data for causing the personal computer 2 to recognize the printer 1 as a printer class device.

Further, the internal storage device 104 holds class setting information for controlling whether the personal computer 2 is caused to recognize the printer 1 as a mass storage class device (storage device) or is cause to recognize the printer 1 as a printer class device.

The CPU 101 is capable of changing the class setting information in accordance with the state of communication with the personal computer 2 or in response to a command from the user interface module 105.

Figure 2:
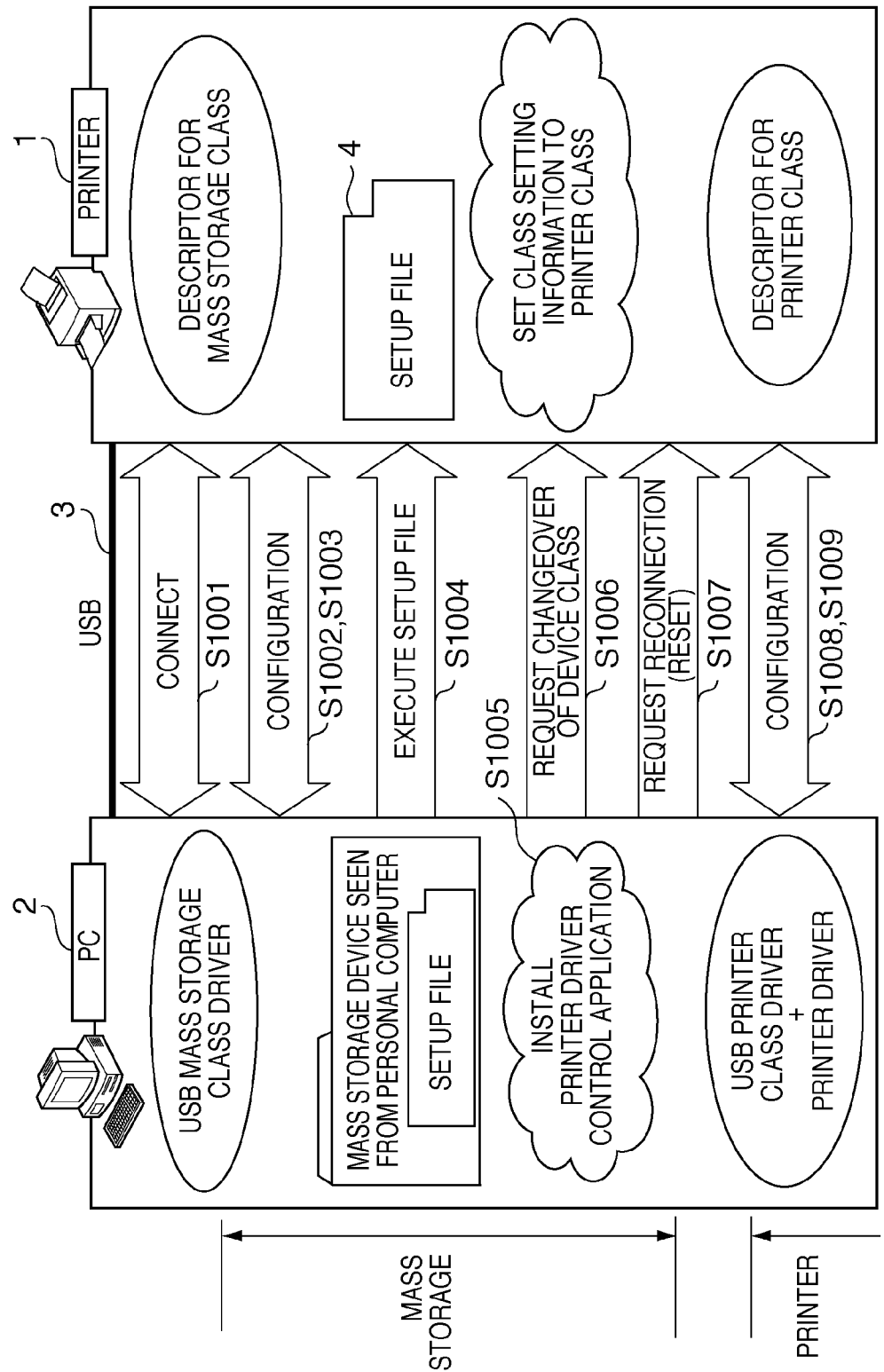
FIG. 2 is a diagram illustrating an overview of operation of a printer and personal computer according to an embodiment.

FIG. 2 is a diagram illustrating an overview of operation of the printer 1 and personal computer 2 according to this embodiment. The personal computer 2 is equipped with an operating system having a standard device driver for the USB mass storage class. Examples of such an operating system are the Windows (registered trademark) and Macintosh (registered trademark) operating systems. The personal computer 2 has a USB port and is capable of communicating with the printer 1 via a USB cable 3 (or wirelessly). A setup file 4 is a file that contains a printer driver specific to the printer 1. The setup file 4 is stored in the internal storage device 104 in such a manner that access from the personal computer 2 is possible when the printer 1 is operating according to the USB mass storage class. The setup file 4 also contains a printer driver as a control application for controlling the printer 1 by the personal computer 2. By executing the setup file 4, the personal computer 2 can install in itself the printer driver of the printer 1. The printer 1 and personal computer 2 operate in accordance with steps S1001 to S1009. The details thereof will be described with reference to FIG. 3.

Figure 3:
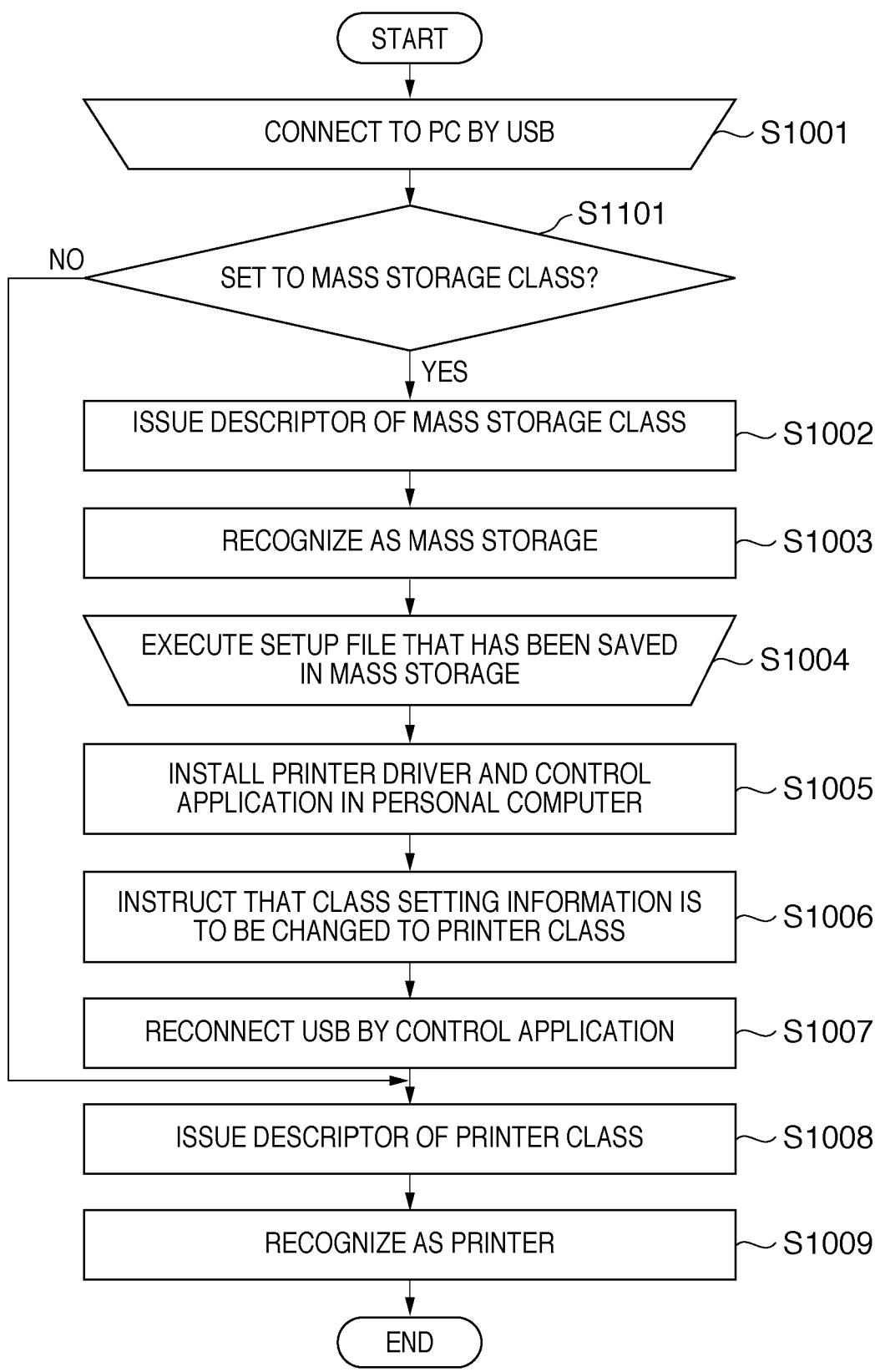
FIG. 3 is a flowchart illustrating operation of a printer and personal computer according to an embodiment.

With reference to FIG. 3, when the user connects the printer 1 and personal computer 2 using the USB cable 3 in step S1001, determination processing is executed in step S1101. Unless contrarily stated, in each of the flowcharts below, inclusive of the flowchart of FIG. 3, processing executed by the printer 1 is implemented by the CPU 101 executing the program that has been stored in the ROM 102. Further, processing by the personal computer 2 is executed by the CPU (not shown) of the personal computer 2 and is implemented by running the operating system or by executing a control application, etc.

In step S1101, the printer 1 determines whether the class setting information within the internal storage device 104 is indicative of "mass storage class". If the information is indicative of the mass storage class, control proceeds to step S1002. Otherwise, control proceeds to step S1008. In a case where the printer 1 has not been connected to the personal computer 2 even a single time, the class setting information will indicate the mass storage class. It should be noted that even in a case where the class setting information is not indicative of the mass storage class, it is possible to change the class setting information to the mass storage class using the user interface module 105, as will be described later.

In step S1002 (when communication starts), the printer 1 issues (transmits) a descriptor (a first descriptor), which corresponds to the mass storage class, to the personal computer 2 as the descriptor.

In step S1003, the personal computer 2 recognizes the printer 1 as a mass storage class device by using the device driver for the mass storage class with which the operating system is equipped as a standard. As a result, the personal computer 2 is capable of acquiring the setup file 4.

In step S1004, the personal computer 2 accepts user operation, reads the setup file 4 that has been stored in the internal storage device 104 and causes the CPU of the personal computer 2 to execute the file.

In step S1005, the personal computer 2 installs in itself the printer driver and the control application using the setup file 4.

In step S1006, the personal computer 2 instructs the printer 1 to change the class setting information to "printer class" using the control application. The printer 1 responds by changing the class setting information to "printer class".

It should be noted that instead of the change in the class setting information being performed in response to a command from the personal computer 2, it may be so arranged that that the change is made proactively on the side of printer 1 in response to the printer 1 recognizing that the printer driver has been accessed by the personal computer 2.

In step S1007, the personal computer 2 performs a USB reset operation using the control application. In this way the USB of the printer 1 is disconnected temporarily and then reconnected (i.e., once communication has been disconnected, the USB is reconnected). It should be noted that it may be so arranged that this disconnection of communication and reconnection is carried out proactively by control on the side of the printer 1.

In step S1008, the class setting information should be "printer class". Accordingly, the printer 1 sends the personal computer 2 a descriptor (a second descriptor) corresponding to the printer class.

In step S1009, the personal computer 2 recognizes the printer 1 as a printer class device by using the printer driver that was installed in step S1005. As a result, the personal computer 2 is capable of utilizing the printer function of the printer 1.

By virtue of the processing set forth above, the personal computer 2 is capable of recognizing the printer 1 as a printer after acquiring and installing the printer driver from the printer 1.

Further, when the user next connects the printer 1 and the personal computer 2, the class setting information of the printer 1 will be the printer class and therefore processing will proceed from step S1101 to step S1008. Accordingly, a situation where the personal computer 2 is caused to recognize the printer 1 as a mass storage class device unnecessarily is avoided.

Figure 4:
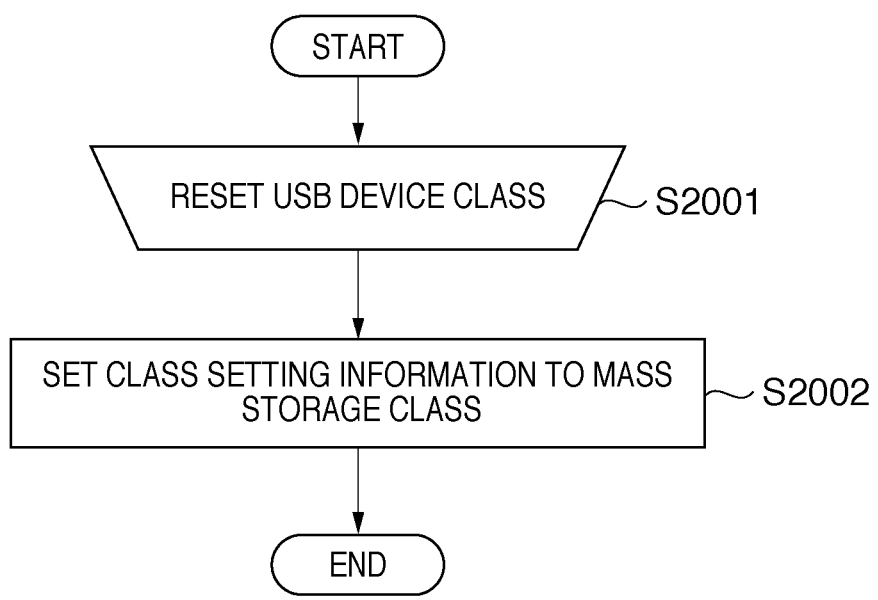
FIG. 4 is a flowchart illustrating processing for resetting class setting information.

Further, when the printer 1 is connected to a personal computer, other than the personal computer 2, in which the printer driver for printer 1 has not been installed, the printer 1 resets the class setting information to the mass storage class in accordance with the flowchart of FIG. 4, whereby it becomes possible to install the printer driver again.

In step S2001 in FIG. 4, the user instructs the printer 1 via the user interface module 105 to reset the class setting information. The user may utilize the control application of the personal computer 2 rather than the user interface module 105. In this case, however, it is required that a USB connection exist between the printer 1 and the personal computer 2.

In step S2002, the printer 1 sets the class setting information to "mass storage class" upon being instructed to reset the class setting information.

Figure 5:
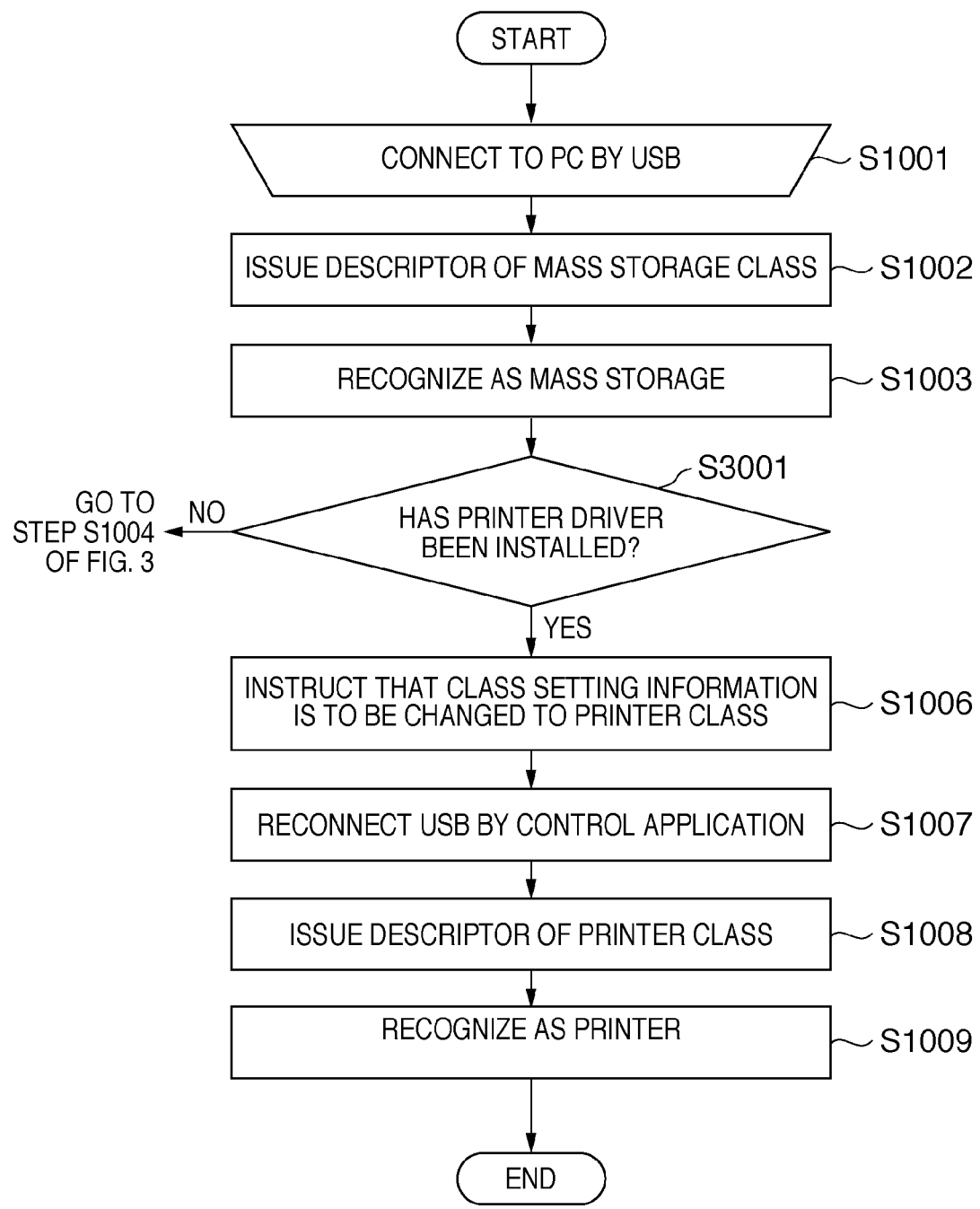
FIG. 5 is a flowchart illustrating processing in a case where a printer in which class setting information has been reset has been connected to a personal computer in which a printer driver has been installed.

In a case where the printer 1 that has reset the class setting information is connected to the personal computer 2 in which the printer driver has been installed, the processing shown in FIG. 5 is executed. Processing steps in FIG. 5 identical with those shown in FIG. 3 are designated by like step numbers and need not be described again.

In step S3001 in FIG. 5, the personal computer 2 determines whether the printer driver has been installed. If the printer driver has been installed, control proceeds to step S1006 and the personal computer 2 changes the class setting information of the printer 1 to "printer class". If the printer driver has not been installed, on the other hand, then control proceeds to step S1004 in FIG. 3 and the processing described above with reference to FIG. 3 is executed.

In accordance with this embodiment, as described above, the printer 1 causes the personal computer 2 to recognize the printer as a mass storage class device in accordance with the class setting information and allows the personal computer 2 to install the printer driver. Thereafter, the printer 1 changes the class setting information to "printer class" in accordance with a command from the personal computer 2 and causes the personal computer 2 to recognize the printer as a printer class device.

As a result, it is possible to supply a device driver from an information processing apparatus (e.g., a client apparatus such as the printer 1) to a host apparatus (e.g., the personal computer 2) while mitigating problems such as a more complicated arrangement.

In the foregoing embodiment, the printer switches the class setting information, of which notification is given when the printer is connected to the personal computer, between the mass storage class and the printer class. However, the invention is applicable to other types of apparatus as well.

For example, it may be so arranged that in a case where a scanner or digital camera is connected to the host apparatus and notification of this fact is given, the class setting information of which notification is given is switched between the mass storage class and the image class.

In this case, if notification has been given that the setting information is the mass storage class, a memory would be controlled so as to make it possible for the personal computer to access a driver for controlling the scanner or digital camera.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-291495, filed on Nov. 13, 2008, which is hereby incorporated by reference herein in its entirety.

What is claimed is:

1. An information processing apparatus comprising:
a printing unit;
a memory that stores a first descriptor indicating that the information processing apparatus operates as a storage device, a second descriptor indicating that the information processing apparatus operates as a printer device, and a printer driver which, in a case where the information processing apparatus is operating as the storage device, is information accessible by a host apparatus and is used by the host apparatus in order to control the information processing apparatus as the printer device in accordance with a given standard;
a communication unit which, at the start of communication with the host apparatus, transmits the first descriptor to the host apparatus and communicates with the host apparatus in such a manner that the host apparatus is capable of accessing the printer driver; and
a changing unit that changes the descriptor that said communication unit transmits to the host apparatus to the second descriptor after the printer driver has been accessed from the host apparatus.

2. The apparatus according to claim 1, wherein in a case where, after the printer driver has been accessed from the host apparatus, said communication unit disconnects communication temporarily and then reconnects to the host apparatus, said communication unit, instead of transmitting the first descriptor, transmits the second descriptor, which indicates that the information processing apparatus operates as the printer device, to the host apparatus.

3. The apparatus according to claim 1, wherein the given standard is the USB standard, and the second descriptor indicates that the information processing apparatus operates as a printer class device.

4. The apparatus according to claim 1, wherein the first descriptor is information indicating that the information processing apparatus is a mass storage class device compliant with the USB standard.

5. The apparatus according to claim 1, wherein the second descriptor is information indicating that the information processing apparatus is a printer class device compliant with the USB standard.

6. The apparatus according to claim 1, wherein:
the memory stores a control application as well as the printer driver; and
the control application is an application used by the host apparatus to instruct the information processing apparatus to change the descriptor that the communication unit transmits to the host apparatus.

7. A method of controlling an information processing apparatus having a printing unit and a memory that stores a first descriptor indicating that the information processing apparatus operates as a storage device, a second descriptor indicating that the information processing apparatus operates as a printer device different from the storage device, and a printer driver which, in a case where the information processing apparatus is operating as the storage device, is information accessible by a host apparatus and is used by the host apparatus in order to control the information processing apparatus as the printer device in accordance with a given standard, said method comprising:
a communication step of transmitting the first descriptor to the host apparatus at the start of communication and communicating with the host apparatus in such a manner that the host apparatus is capable of accessing the printer driver; and a changing step of changing the descriptor that is transmitted to the host apparatus at said communication step to the second descriptor after the printer driver in the memory has been accessed from the host apparatus.

8. A non-transitory recording medium on which has been recorded a program for causing a computer of an information processing apparatus to execute the steps of a control method, wherein the information processing apparatus has a printing unit and a memory that stores a first descriptor indicating that the information processing apparatus operates as a storage device, a second descriptor indicating that the information processing apparatus operates as a printer device different from the storage device, and a printer driver which, in a case where the information processing apparatus is operating as the storage device, is information accessible by a host apparatus and is used by the host apparatus in order to control the information processing apparatus as the printer device in accordance with a given standard, said method comprising:

a communication step of transmitting the first descriptor to the host apparatus at the start of communication and communicating with the host apparatus in such a manner that the host apparatus is capable of accessing the printer driver; and a changing step of changing the descriptor that is transmitted to the host apparatus at said communication step to the second descriptor after the printer driver in the memory has been accessed from the host apparatus.

9. A printer comprising:

a printing unit;

a memory that stores a first descriptor for causing a host apparatus to recognize the printer as a storage device, a second descriptor for causing the host apparatus to recognize the printer as a printer device, and a printer driver for the printer which, in a case where the printer has been recognized as the storage device, is information accessible by the host apparatus;

a communication unit which, at the start of communication with the host apparatus, transmits the first descriptor to the host apparatus and communicates with the host apparatus in such a manner that the host apparatus is capable of accessing the printer driver; and a changing unit that changes the descriptor that said communication unit transmits to the host apparatus to the second descriptor after the printer driver has been accessed from the host apparatus.

10. The printer according to claim 9, wherein in a case where, after the printer driver has been accessed from the host apparatus, said communication unit disconnects communication temporarily and then reconnects to the host apparatus, said communication unit, instead of transmitting the first descriptor, transmits the second descriptor, which indicates that the printer operates as the printer device, to the host apparatus.

11. The printer according to claim 9, wherein the first descriptor is information indicating that the printer is a mass storage class device compliant with the USB standard.

* * * * *